United States Patent [19]

Klemt

[11] 4,134,021

[45] Jan. 9, 1979

[54] METHOD OF CLASSIFYING CHARACTERS HAVING CHARACTERISTICS THAT DIFFER GREATLY FROM STANDARD CHARACTERS

[76] Inventor: Arthur Klemt, Kochelseestrasse 16, 8031 Grobenzell, Fed. Rep. of Germany

[21] Appl. No.: 789,365

[22] Filed: Apr. 21, 1977

[30] Foreign Application Priority Data

Apr. 30, 1976 [DE] Fed. Rep. of Germany ....... 2619245

[51] Int. Cl.² .............................................. G06K 9/00
[52] U.S. Cl. .......................... 250/567; 340/146.3 MA
[58] Field of Search .............. 340/146.3 MA, 146.3 S, 340/146.3 Z; 250/567, 556

[56] References Cited

U.S. PATENT DOCUMENTS

| | | | |
|---|---|---|---|
| 3,432,673 | 3/1969 | Mader | 250/567 |
| 3,790,955 | 2/1974 | Klemt | 340/146.3 MA |
| 3,795,894 | 3/1974 | Klemt | 340/146.3 MA |

*Primary Examiner*—David C. Nelms
*Attorney, Agent, or Firm*—Merriam, Marshall & Bicknell

[57] ABSTRACT

This disclosure deals with a method of classifying characters having characteristics which differ greatly from standard characters, where the characters are projected onto an image field, said field being divided into imaginary raster areas; where, by means of photo-electric devices, from each raster area, a raster area voltage is generated, and at an area of the background where there is no character, a reference voltage is generated; each raster area voltage is subtracted from the reference voltage and thus, for each raster area, a raster area difference voltage is generated; these raster area difference voltages, by forming linear combinations, are processed into output voltages, and, by comparing the output voltages with a sum raster area difference voltage which is generated by totalling the raster area difference voltages, it is ascertained whether the output voltage of each linear combination lies within the limits decisive or determinative for the class to be identified.

5 Claims, 5 Drawing Figures

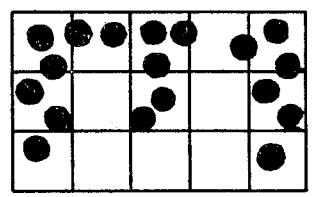
Fig. 2c
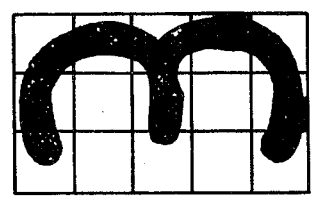
Fig. 2b
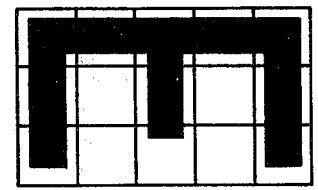
Fig. 2a
Fig. 1

METHOD OF CLASSIFYING CHARACTERS HAVING CHARACTERISTICS THAT DIFFER GREATLY FROM STANDARD CHARACTERS

The representation of the characters onto an image field divided into imaginary raster areas is usually achieved as a darkening on a light background. In the following discussion, under "darkening or darkness on a light background", other representations of the characters such as light characters on a dark background, or characters on a light-transmittent background such as film, will also have to be logically understood.

During the classification of characters by a machine, in general, not standard characters having identical form, identical thickness of line, and identical darkness are to be identified, but characters which, on a variable background, are printed by high speed printers, typing machines, or mosaic printers or written by hand with variable writing utensils are to be identified; that is, characters which in form, thickness of line, and darkness, can vary considerably from the standard characters, and the characteristics of which fluctuate considerably are to be identified. Large fluctuations of the characteristics result from contrast differences.

Contrast differences can occur when the darkness of the representations of a class of characters remains the same, but when the brightness or color of the background changes, or when, with a uniform brightness or color of the background, the darkness of the representations of a class of characters changes, or when the brightness or color of the background as well as the darkness of the representations of a class of characters change.

The character line stroke of an individual character also can reveal contrast differences. Thus, in characters which have been printed with typewriters or high speed printers, for example the upper or the right area can be more or less strongly darkened than the lower or left area. Particularly large contrast differences within an individual character occur in mosaic characters, the stroke of which consists of points only which may touch one another or also may have a spacing up to twice the diameter of a point, whereby even the line is interrupted several times. Also, the darkness of the individual points, or dots, can differ.

For the classification of characters, in the methods and circuits which are based on a raster-type scanning of the image field, the voltages derived or taken from the raster areas are combined with one another. For this, according to the present knowledge in the art, linear functional elements have proven suitable, in particular, linear resistance networks in which the voltages taken from the raster areas are processed by analog methods; or computors performing the basic arithmetic types of addition and multiplication which digitally process the voltages from the raster areas after having been converted to digital form. Both processing possibilities will subsequently be called "forming of linear combinations". In principle, each linear combination stores characteristics of standard characters and compares these with the corresponding characteristics of the characters to be classified.

In some known processes and circuits (e.g., the U.S. Pat. No. 3,271,576 or "Internationale Elektronische Rundschau" 1968, pages 19 to 21), for the classification of characters differing greatly from the standard characters, in the linear combinations, the characteristics of all representations being considered of the different versions of the characters to be classified, must be stored. Upon submitting an unknown character, all stored values of the characteristics of the different representations of all classes would have to be compared with the characteristics of the unknown character. For the classification of characters having greatly fluctuating characteristics, up to about 1,000 linear combinations per class would be necessary.

It also has been known, in order to reduce the intolerable expense, to store in the linear combinations, instead of the characteristics of individual representations, the characteristics of groups of representations, the characteristics of which only deviate within certain limits. These limits, however, will have to be narrow, since otherwise the separation reliability decreases considerably with respect to other classes, so that there still will be a great number of linear combinations necessary and the technical expenditure is still quite great.

The latter also is true for processes which make use of the so-called optimazation. Here one starts with the idea that there are raster areas within the various representations of a character class which are always white and those which are always dark, and only these are used for the forming of linear combinations. Raster areas which, for the various representations of a class, at one time are dark and at one time are white, are not used for the formation of linear combinations. Due to the omission of these raster areas, important characteristics are not utilized in the recognition process. The number of linear combinations is reduced on one hand, but, on the other hand, additional technical expense is created for optimazation. In addition, the separation reliability against characters of other classes, is essentially reduced.

Furthermore, methods and circuits have been known which need only a considerably smaller number of linear combinations. According to the German Patent No. 18 11 420, (U.S. Pat. No. 3,795,894) this is achieved by means of resistance networks, where the resistances, provided for forming linear combinations, for each class are determined according to a determination of the characteristic vectors of the covariance matrix of the characteristics. This method of determining resistances for forming linear combinations, reduces by a multiple the number of linear combinations or the number of the resistance networks respectively as compared to the first-mentioned method and circuits, but does not take into consideration the representations of characters of competing classes, whereby the separation reliability or selectivity between characters of competing classes, in particular in classifications of characters with greatly varying contrast, is not sufficient. Furthermore, the voltages taken from each of the raster areas and supplied to the resistance networks must necessarily have positive as well as negative polarities whereby a considerable technical expense is created.

This also holds good for the German Patent Application No. 20 26 033, that is, all voltages taken from the raster areas must have positive as well as negative polarity. In this method, the voltages in the resistance networks of one class are combined from those raster areas which combined correspond to three types of characteristic form parts of characters of this class. The linear combinations thus formed allow only a classification of characters with small contrast differences.

A joint disadvantage of all methods and circuits mentioned, therefore is that their linear combinations, at tolerable technical expenses, are not suited to classify, with sufficient selectivity characters with strong contrast differences, and form distortions resulting therefrom and interruptions of the character line. Therefor in the known methods and circuits it would be necessary to considerably increase the number of the linear combinations which essentially would increase the technical expense.

For reducing the influence of contrast differences on the classification of characters, several methods and circuits are known. According to the German Patent No. 18 11 420, an additional voltage is supplied to the resistance networks which execute the linear combinations, whereby the output voltages of the resistance networks, upon the presence of a representative of the class to be identified, lie close to zero. This additional voltage is taken from all raster areas. Since because of the joint changing of the voltages coming from the raster areas and supplied individually to the resistance networks, such as by changing the degree of darkness of the characters submitted for classification, the additional voltage changes too, a compensation effect takes place.

According to the German Patent Application No. 20 26 033, the output voltage of each resistance network is compared to a voltage which is proportional to the sum of the voltages taken from the raster areas, in order to ascertain whether the output voltages lie within the limits decisive for the class to be identified. Upon changes of the output voltages of the resistance networks, e.g., by the change of the degree of darkness of the characters to be classified, the comparison voltage changes as well, whereby the influence of the contrast changes is reduced.

Due to these measures, in the first case, by the supply of an additional voltage taken from all raster areas and supplied to the resistance networks and, in the second case, the use of a comparison voltage also taken from all raster areas, the influence of the contrast differences can only be reduced to a limited extent, since the portion darkened by a character in the image field only amounts to a fraction of the total area (about 15% to 35%), the additional voltage or the comparison voltage respectively is thus determined predominently by the non-darkened areas of the image field, and thus, upon a change of the degree of darkening of the characters submitted for classification, the additional voltage and the comparison voltage respectively changes considerably less than the degree of darkening.

A method of decreasing the influence of contrast differences and of the background brightness (German Auslegeschrift No. 20 44 795) has been known, where a raster area difference voltage is formed for each raster area, from a reference voltage taken from areas of the background which have not been darkened by characters and from the voltages taken from the raster areas; and where these raster area difference voltages individually, as well as in sum, instead of the voltages directly taken from the raster areas, are supplied to the resistance networks, and the comparison voltage is formed from the total of all raster area difference voltages. This method shows a possibility of reducing the influence of differences of the contrasts and of the background brightness in the prescribed resistance networks; it, however, neither tells anything concerning the type and dimensioning of the resistance networks or the linear combinations respectively necessary for the classification of the characters; nor does it state anything concerning the value of the comparison voltage through which one ascertains, whether the output voltages of the linear combinations lie within the limits prescribed for the class to be identified.

This invention has the task of providing a process for classifying using a machine, characters having characteristics differing considerably from the standard characters, said process using a considerably smaller technical expenditure than methods known before; in particular, having fewer and simpler linear combinations to which only voltages of one polarity have to be supplied, and guarantees a great selectivity against characters of other classes, and is insensitive to contrast changes of any kind, namely, insensitive to differences in the brightness of the background, the darkness of the characters to be classified, and the darkness within a character.

To solve this problem, the subject matter of this invention comprises a process for classifying characters having characteristics differing considerably from the standard characters; where the characters are projected onto an image field, said field being divided into imaginary raster areas, by means of photoelectric devices from each raster area is generated a raster area voltage, and, at an area of the background where there is no character, a reference voltage is generated, each raster area voltage being subtracted respectively from the reference voltage, and due to this, for each raster area, a raster area difference voltage is generated, these raster area difference voltages, by forming linear combinations, are processed into output voltages, and by means of comparing the output voltages with a sum raster area difference voltage, the latter being created by totalling the raster area difference voltages, one ascertains whether the output voltage of each linear combination lies within the limits prescribed for the class to be identified; which is characterized, according to the invention, by using an image field which is divided into at least nine and at the most sixty imaginary raster areas, (1) that one ascertains, for the standard character of the class to be identified, the raster area difference voltages and the sum raster area difference voltage, (2) one forms two types of linear combinations from these voltages, wherein:

(a) the linear combinations of the first type each is formed as a difference of two voltage types, of which the first voltage type for a linear combination each:

(A) consists only of one raster area difference voltage, the value of which, in the case of an image field subdivided into nine to thirty raster areas, amounts to at least 2%, and preferably at least 3%; and, in case of an image field divided into thirty to sixty raster areas, amounts to at least 1.5%, and preferably at least 2%, of the sum raster area difference voltage, or;

(B) is formed from several raster area difference voltages the total value of which, in the case of an image field divided into nine to thirty raster areas amounts to at least 7%, and preferably at least 10% and, in the case of an image field divided into thirty to sixty raster areas, amounts to at least 4% and preferably at least 6%, of the sum raster area difference voltage, and the second voltage type for a linear combination each is formed from the sum raster area difference voltage in such a manner that it has the same amount, but the opposite polarity, as the first voltage type, and (b) the linear combinations of the second type are formed from one or several raster area difference voltages, the total value of which, in the case of an image field divided into nine to thirty raster areas, amounts to at the most 5%, and preferably at the most 3%; and in the case of an image field divided into thirty to sixty raster areas, amounts to at the most 3.0%, and preferably at the most 2.0%, of the sum raster area difference voltage, (3) one ascertains, for the character to be classified, the raster area difference voltages and the sum raster area difference voltage;

(4) one forms, from these voltages, the same linear combinations as for the standard character, and (5) one ascertains:

(a) whether the output voltage of each linear combination of the first type deviates not more than ± 30% from the value of the second voltage type, and (b) whether the output voltage of each linear combination of the second type lies below the sum of (1) 1% of the value of the sum raster area difference voltage and (2) the percentage of the sum raster area difference voltage represented by the total value of those raster area difference voltages from which, according to paragraph 2b, the linear combinations of the second type have been formed.

In order to form the linear combinations, single as well as several raster area difference voltages can be made use of. For the classification of characters with small differences in the darkness within the character and little variation in form, but strongly differing in contrast as compared to the standard character, the first voltage type of a linear combination of the first type each can consist of only one single raster area difference voltage, the value of which, in the case of an image field divided into nine to thirty raster areas, amounts to at least 2%, and preferably at least 3%, and, in case of an image field divided into thirty to sixty raster areas, amounts to at least 1.5%, and preferably at least 2%, of the sum raster area difference voltage.

If the characters to be classified reveal also, within the character, varying darkness and/or strongly varying form as compared to the standard character, then the first voltage type of the linear combinations of the first type is preferably formed from several raster area difference voltages, the total value of which, in the case of an image field divided into nine to thirty raster areas, amounts to at least 7%, and preferably at least 10% and, in the case of an image field divided into thirty to sixty raster areas, amounts to at least 4%, and preferably at least 6% of the sum raster area difference voltage. The total value, in both cases, should amount at the most to 60% of the sum raster area difference voltage.

The linear combinations of the second type can either be formed from several raster area difference voltages, or consist of only one raster area difference voltage. The total value, in the case of an image field divided in nine to thirty raster areas, must amount to at the most 5%, and preferably at the most 3%, and, in case of an image field divided into thirty to sixty raster areas, must amount to at the most 3%, and preferably at the most 2% of the sum raster area difference voltage. Whether the linear combinations of the second type are formed from only one or from several raster area difference voltages, mainly depends on the technical situations while carrying out the process, such as on the stability of the image field lighting, the photo-electric devices, and the optical devices, etc. Preferably the linear combinations of the second type consist of one single raster area difference voltage only, since in this case, the technical situations or conditions have less influence on the recognition reliability (selectivity) than when forming the linear combinations from several raster area difference voltages. In the latter case, however, the number of the linear combinations is smaller, which often is of practical importance.

In order to ascertain whether the deviations of the characteristics of the characters to be identified, from the characteristics of the standard character stored in the linear combinations, lie within the prescribed classification limits, the output voltage of each linear combination is used and checked a) whether the output voltage of each linear combination of the first type does not deviate more than ± 30% from the value of the second voltage type; and b) whether the output voltage of each linear combination of the second type is below 1% of the value of the sum raster area difference voltage, increased by a percentage (said percentage refers to the sum raster area difference voltage) of the total value of those raster area difference voltages out of which the linear combinations of the second type have been formed (see the example 1 hereinafter).

The stated limits of ± 30% for the output voltages of the linear combinations of the first type guarantee a sufficient separation reliability of the characters to be identified as against the characters of the competing classes. If a separation reliability is demanded which exceeds the usual amount, or if characters are to be identified which, despite belonging to different classes, vary only little from one another, as can be the case with handwritten characters, the limits of the output voltages can be narrowed, for example from ± 30% to ± 20%.

Fundamentally, no more linear combinations are formed than there are raster areas, since otherwise the linear combinations exceeding the number of raster areas are dependent on linear combinations which have already been formed. However, for characters which are hard to identify, such as the letter K, suitably as many linear combinations are formed as there are raster areas. On the other hand, with characters which are easily recognizable for classification, such as the FIG. 1, not all possible linear combinations are necessary. Preferably the number of the linear combinations for a character class amounts to at least 60% of the number of the raster areas.

There are characters, such as those with a broad thickness of line, where the described conditions for the formation of linear combinations of the second type cannot be met. For identifying such characters, only linear combinations of the first type are formed.

With the present technical conditions on hand, the method of the invention is preferably carried out, either:

in the analog art by supplying to summing circuits (in order to form the raster area difference voltages and the sum raster area difference voltage), the voltages taken from the raster areas and from the area in the background where there is no character; to linear resistance networks (in order to form the linear combinations); and to threshold circuits (in order to compare the output voltages of the resistance networks with the reference voltage), or in the digital are in which the analog voltages are changed into digital values and these are processed in digital computors, according to the conditions of the linear combinations.

The method of the invention is explained in the following example of the classification of representatives of the number 3 in connection with the attached drawings, wherein:

FIG. 1 shows an image field for the classification of characters;

FIGS. 2a to 2c show various embodiments of the number 3 in the image field of FIG. 1.

Figure 3:
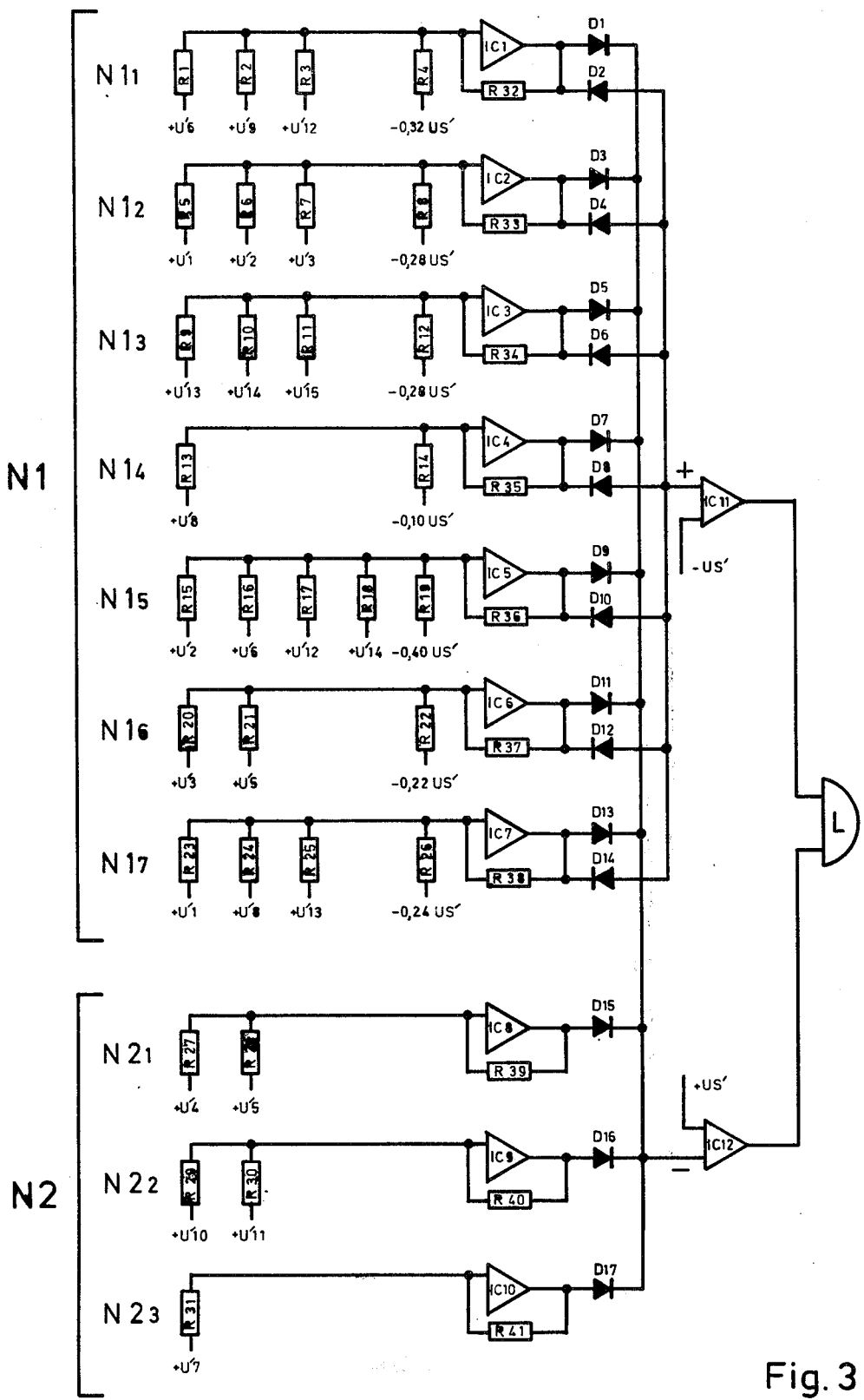
FIG. 3 shows a circuit for carrying out the process.

According to FIG. 1, the image field is divided into raster areas 1-15, and outside the image field there is an area F which is never darkened. In such an image field, according to FIG. 2a, a standard character of the number 3 is entered with the proper darkness, the proper thickness of line and the proper form. According to FIG. 2b, a representation of the number 3 having another form and at about half the degree of darkness as compared to the standard character and illustrated by the dashed lines, has been entered. According to FIG. 2c, a representation consisting of dots making up the number 3, as it actually may happen in mosaic printing with a matrix of 5 × 7 points, has been entered. The representations of FIGS. 2b and 2c, which reveal considerable differences with respect to darkness, thickness of line, form and interruptions of the line or stroke as compared with the standard character of FIG. 2a, are to be classified according to the method of the invention.

For this, in a known manner, such as by photo transistors, from each raster area 1-15 and from the not darkened area F, electrical voltages are generated and out of those the following voltages are created as by using inverting and summing circuits:

(a) from the raster areas 1-15, the voltages −U1, −U2−−U15, which are proportional in value to the darkness values of these raster areas;

(b) the voltage +UF from the not darkened area F;

(c) by adding each of the voltages −U1, −U2−−U15 to the voltage +UF, the raster area difference voltages +U′1, +U′2−+U′15 proportional to the darkness values of the raster areas 1-15;

(d) by addition of the voltages +U′1, +U′2−+U′15, the sum raster area difference voltage +US′;

(e) by inversion of the voltage +US′, the sum raster area difference voltage −US′.

From the raster area difference voltages +U′1, +U′λ 2−+U′15 thus created and the sum raster area difference voltages −US′ and +US′, the linear combinations and the limits for the output voltages of the linear combinations are ascertained. We proceed from the following statement that, in a non-darkened image field, the voltages taken from the raster areas 1-15, and from the area F of the background which is not darkened by characters, have the same value.

EXAMPLE 1

According to the invention, the first voltage type of the linear combinations of the first type and the linear combinations of the second type can consist of one single raster area difference voltage, whereby the raster area difference voltages U′1, U′2-U′15 are being used. This is illustrated by the linear combinations shown in Chart I for the classification of the representative of the number 3 illustrated in FIG. 2b, said number 3 having less darkness and different form from the standard character illustrated in FIG. 2a.

As indicated in Chart I, with respect to linear combinations of the first type, the absolute value of the difference between the first voltage type and the second voltage type is less than the stated limits of the output voltage. With respect to linear combinations of the second type, the stated values are less than the stated limits of the output voltage.

CHART I

| No. | First Voltage Type | Second Voltage Type | Limits Of The Output Voltage |
|---|---|---|---|
| Linear Combinations Of The First Type | | | |
| 1 | U′1 | −0.07 US′ | <0.021 US′ |
| 2 | U′2 | −0.10 US′ | <0.030 US′ |
| 3 | U′3 | −0.11 US′ | <0.033 US′ |
| 4 | U′6 | −0.10 US′ | <0.030 US′ |
| 5 | U′8 | −0.10 US′ | <0.030 US′ |
| 6 | U′9 | −0.12 US′ | <0.036 US′ |
| 7 | U′12 | −0.10 US′ | <0.030 US′ |
| 8 | U′13 | −0.07 US′ | <0.021 US′ |
| 9 | U′14 | −0.10 US′ | <0.030 US′ |
| 10 | U′15 | −0.11 US′ | <0.033 US′ |
| Linear Combinations Of The Second Type | | | |
| 11 | U′4 | | <0.01 US′ |
| 12 | U′5 | | <0.01 US′ |
| 13 | U′10 | | <0.01 US′ |
| 14 | U′11 | | <0.01 US′ |
| 15 | U′7 | | <0.03 US′ |

Since the raster area difference voltages taken from the raster areas are proportional to the darkness values of the raster areas, the raster area difference voltages necessary for the formation of the linear combinations can be directly ascertained from the darkness values of the raster areas. Thus, the linear combinations 1, 2,-10 of the first type, based on the standard character of the number 3, illustrated in FIG. 2a, can be formed by means of ascertaining - by summing the areas of the individual raster areas 1, 2, 3, 6, 8, 9, 12, 13, 14, 15, darkened by the standard character according to FIG. 2a - the entire darkened area of these raster areas and from that, in proportion, the darkened area for each individual of these raster areas. For example, the darkened area of the raster area 1, from which the raster area difference voltage U′1 of the linear combination 1 of Chart I is formed, amounts to 7% of the entire area darkened by these raster areas. The raster area difference voltage U′1 of the linear combination 1 taken from raster area 1 thus has a value of 7% of the sum raster area difference voltage −US′, that is −0.07 US′.

In an analogous manner, the linear combination 11-15 of the second type result for the standard character according to FIG. 2a, and the linear combinations 1-15 result for the representation according to FIG. 2b.

The values stated in the column of Chart I titled "Limits Of The Output Voltage" state, as a share of the second voltage type for the linear combinations of the first type, the output voltage determinative for the class to be identified which may amount up to ± 30% of the value of the second voltage type. Thus, for example, in the linear combination 1, the output voltage has to be smaller than 0.07 times (30/100) times US′ = 0.021 US′, so that a classification of the submitted character can take place into class 3.

The output voltages of the linear combinations 11, 12, 13, 14 of the second type decisive for the classification of the submitted representation according to FIG. 2b into Class 3, lie below 1% of the value of the sum raster area difference voltage US′. These output voltages which are identical with the raster area difference voltages U′4, U′5, U′10, U′11, have theoretically the value of zero, since these raster area difference voltages have been taken from non-darkened raster areas; however, the limit of these output voltages has been fixed to 1% of the sum raster area difference voltage US′ because of the technical situation. The limit of the output voltage of the linear combination 15 amounts to 3% of the sum raster area difference voltage US', since the raster area difference voltage U"7 identical with the output voltage, has been taken from raster area 7, which shows a darkness of 2% of the total darkening of all raster areas as referred to the standard character of FIG. 2a.

The linear combinations and the limits of the output voltages stated in Chart I can be realized, in order to carry out the method, by means of electrical circuits, such as according to the circuit illustrated in FIG. 3, or after changing the raster area difference voltages into digital values, by means of calculator operations.

Because the output voltages of the linear combinations of the first type are formed by two types of voltages, each of which has been taken from the raster areas, and by forming the raster area difference voltages, both voltage types of these linear combinations change, upon contrast changes, by the same factor.

If the output voltages of these linear combinations have the value of zero, such as when characters are submitted having the same characteristics as the standard character; and if, such as if characters with the same form but with different darkness and varying background brightness are submitted for identification, then the output voltages remain at the value of zero. If however, the output voltages are different from zero, such as when characters are submitted for identification, the form and/or darkness of which deviate from the standard character, then the output voltages change by at the most the same factor by which the darkness of the characters to be identified deviate from the darkness of the standard character. In known methods and circuits the output voltages change by a multiple, when these had the value of zero as well as when these were different from the value of zero.

Also, in the linear combinations of the second type, the deviations of the background brightness and of the darkness of the characters to be identified, from the darkness of the standard character, have no influence upon the output voltages when the characters to be identified have the same form as the standard character, and thus the output voltages have the value of zero. If the output voltages are different from zero, such as when characters are submitted for identification, the form and darkness of which vary from the standard character, then the output voltages change, as with the linear combinations of the first type, also only by the same factor, as the darkness of the characters to be identified deviate from the darkness of the standard characters.

The output voltages of the linear combinations are compared, according to the invention, with portions of the sum raster area difference voltage. The latter changes upon deviations of the darkness of the characters to be identified from the darkness of the standard character by the same factor as the output voltages of the linear combinations deviating from zero. Due to this, the limits decisive for the class to be identified remain constant, within which the output voltages of the linear combinations have to lie, and the classification result is not influenced at all by differences of the darkness of the characters and of the background brightness.

In the method under discussion, the non-darkened areas of the image field as well as the darkened areas of the image field are used quantitatively for recognition whereby the selectivity (separation security) is essentially greater than in the known methods. This is achieved because the classification result of the linear combinations of the second type which tells about the non-darkened areas of the image field, is completely independent from the background brightness and the technical data, such as changes of the operating voltages and the illumination of the image field.

The second voltage type of the linear combinations of the first type, for one linear combination, each is so formed from the sum raster area difference voltage that it has the same value but has the opposite polarity as the first voltage type. In order to form the sum raster area difference voltage, all raster area difference voltages are used. For the formation of the second voltage type, some raster area difference voltages can perhaps be omitted in the sum raster area difference voltage, so that the second voltage type is not formed from the sum raster area difference voltage, but from one or several raster area difference voltages, the total value of which has the same value, but the opposite polarity of the first voltage type. The formation of the second voltage type from one or several raster area difference voltages is advantageous for those linear combinations of the first type, in which characteristics of symmetry of characters with symmetrical forms, such as the figures 8 and 0, are stored, since hereby the number of the required linear combinations can be reduced.

The method of the invention, due to the cooperation of the two types of the linear combinations in which the limits of the output voltage decisive for the classification of each linear combination are separately determined, requires only a small number of linear combinations for the classification of characters having strongly varying characteristics, since by eliminating the contrast differences, the number of the characteristics necessary for the identification of the characters has been reduced greatly. Consequently, also the number of raster areas is small. Due to the small number of raster areas, the area of each raster area can be made relatively large. Since only one voltage is taken from each raster area for the formation of the linear combinations, this voltage is a measure for the average value of the darkness of the raster area. Therefore, within the area of a raster area, large darkness differences, such as contour interruptions, can be present. Due to this, also characters can be classified, the writing stroke of which is interrupted, or even consists only of individual unconnected dots or points of varying degrees as darkness as is actually the case in characters which are printed by mosaic printing. The following example will show this.

EXAMPLE 2

The representation illustrated in FIG. 2c consisting only of points having varying degrees of darkness and uneven distance, is to be classified as the number 3. Based on the standard character of the class 3, illustrated in FIG. 2a, and based on the shares or parts of the sum raster area difference voltage US' mentioned in the column "Second Voltage Type" of Chart I corresponding to the raster area difference voltages U'1, U'2, U'3, U'6, U'8, U'9, U'12, U'13, U'14, U'15, the linear combinations 1–7 of the first type are formed according to Chart II.

CHART II

| Resistance Networks | No. | First Voltage Type | Second Voltage Type | Limits Of The Output Voltage |
|---|---|---|---|---|
| | | Linear Combinations Of The First Type | | |

CHART II-continued

| Resistance Networks | No. | First Voltage Type | Second Voltage Type | Limits Of The Output Voltage |
|---|---|---|---|---|
| $N1_1$ | 1 | $U'6+U'9+U'12$ | $-0.32\ US'$ | $<0.096\ US'$ |
| $N1_2$ | 2 | $U'1+U'2+U'3$ | $-0.28\ US'$ | $<0.084\ US'$ |
| $N1_3$ | 3 | $U'13+U'14+U'15$ | $-0.28\ US'$ | $<0.084\ US'$ |
| $N1_4$ | 4 | $U'8$ | $-0.10\ US'$ | $<0.030\ US'$ |
| $N1_5$ | 5 | $U'2+U'6+U'12+U'14$ | $<0.40\ US'$ | $<0.120\ US'$ |
| $N1_6$ | 6 | $U'3+U'15$ | $-0.22\ US'$ | $<0.066\ US'$ |
| $N1_7$ | 7 | $U'1+U'8+U'13$ | $-0.24\ US'$ | $<0.072\ US'$ |
| Linear Combinations Of The Second Type | | | | |
| $N2_1$ | 8 | | $U'4+U'5$ | $<0.01\ US'$ |
| $N2_2$ | 9 | | $U'10+U'11$ | $<0.01\ US'$ |
| $N2_3$ | 10 | | $U'7$ | $<0.03\ US'$ |

The selection of the raster areas for the formation of the linear combinations of the first type takes place, based on the standard character of FIG. 2a and based on the consideration of the characteristics of the mosaic printing, namely that the darkness and the position of the individual points vary as shown in FIG. 2c. In order to form a linear combination of the first type specifically not only individual raster area difference voltages, but in most cases several raster area difference voltages are used in order to obtain the average value of the darknesses of as many raster areas as possible. Hereby, the differences in the position and in the darkness of the individual points or dots of the mosaic character are equalized so far that the output voltages of the same linear combinations, which are formed based on the representation of FIG. 2c, lie within the limits determinative for the classification.

The linear combinations 8, 9, 10 of the second type for the standard character of FIG. 2a and the representation of FIG. 2c are formed analogously.

As can be ascertained by using the darkness values of the individual raster areas of FIG. 2c, instead of the raster area difference voltages taken from the raster areas, into the linear combinations of the Chart II, the limits decisive for the class to be identified, within which the output voltages of the linear combinations, upon submitting the characters to be identified, have to lie, are not exceeded by the representation of the number 3 illustrated in FIG. 2c, said representative consisting only of disconnected points of varying darkness and changing position. This, of course, also holds good for representations, the characteristics of which are similar or the same as the characteristics of the standard character illustrated in FIG. 2a or of the representation illustrated in FIG. 2b. On the other hand, the conditions stated in the linear combinations of Chart II are only about halfway fulfilled by representations of other figure character classes. This means a great separating sharpness against other character classes, since already one single condition of a linear combination which has not been fulfilled, prevents the identification of representations of other competing figure character classes as FIG. 3.

A circuit for the realization of the linear combinations by means of resistance networks and for ascertaining the limits of the output voltages of Chart II is illustrated in FIG. 3. Corresponding to the two types of linear combinations, the circuit consists of two types of resistance networks. These are indicated at N1 and N2. In order to classify the representation illustrated in FIG. 2c, the resistance networks of the first type $N1_1$, $N1_2$, $N1_3$, $N1_4$, $N1_5$, $N1_6$, $N1_7$, and the resistance networks of the second type $N2_1$, $N2_2$, $N2_3$ are necessary.

The resistance networks consist of the resistances R1, R2–R31, which are connected in bridge circuits corresponding to the type of the resistance networks and to which the raster area difference voltages $+U'1$, $+U'2-+U'15$ and the respective portions of the sum raster area difference voltage $-US'$ are supplied. The integrated circuits IC1–IC10 with the resistances R32–R41 also form part of the resistance networks. The output voltages of the resistance networks are amplified by the circuits IC1–IC10. With the resistances R32–R41, the amplification of each integrated circuit and, consequently, the output voltage of each resistance network can be adjusted so that the limits decisive or determinative for the class to be identified are the same for each resistance network, due to which, for the resistance networks of one character class, only one comparison voltage is necessary.

The comparison circuits for ascertaining whether the positive or negative output voltages of the resistance networks lie within the limits decisive for the identification of the class consist of integrated circuits IC11 and IC12 and the logic component L. The IC11 and IC12 are threshold switches to which, as a comparison voltage, the sum raster area difference voltage is supplied and which ascertain whether the positive and negative output voltages of the resistance networks lie within the limits decisive or determinative for the class to be identified.

The diodes D1–D17 serve for decoupling and only the largest output voltage each is supplied to the comparison circuits.

For the classification of characters of the type described, the division of the image field into a relative small number of raster areas is sufficient, such as into 15 raster areas as the embodiments described reveal. Prerequisite for a relatively small number of raster areas is that all character characteristics are used for the formation of the linear combinations. This is the case when the image field is scanned without interruption or gaps and thus no character information is lost.

Since a scanning without interruption, due to the technical requirements of photo-electric devices is only possible by using additional optical devices, one has divided, in many scanning devices, the image field into a large number, such as some hundred raster areas, due to which just as large a number of photo-electric devices is necessary. In this case, as well, the method under discussion can advantageously be used, namely, starting with a division of the image field into a small number of imaginary raster areas, such as 15 raster areas according to FIG. 2, one ascertains the linear combinations and takes, from each raster area of the original image field with the large number of raster areas, the raster area difference voltage; combines these raster area difference voltages corresponding to the division of the image field into the small number of raster areas; and with these combined raster area difference voltages one ascertains whether the output voltages of the linear combinations lie within the limits decisive for the classification.

What is claimed is:

1. In the method of classifying a character having characteristics strongly differing from those of a standard character comprising the steps of projecting the character onto an image field which is divided into imaginary raster areas, generating by means of photoelectric devices a raster area voltage from each raster area and a reference voltage from an area of the background where there is no projected character, subtracting each raster area voltage from said reference voltage to obtain for each raster area a raster area difference voltage, forming linear combinations of said raster area difference voltages to produce output voltages, and comparing said output voltages with a sum raster area difference voltage obtained by summation of the raster area difference voltages to determine whether the output voltage of each said linear combination lies within the limits decisive for the class to be identified, the improvement comprising the steps of:

A. sub-dividing said image field into 9–60 imaginary raster areas;

B. ascertaining, for the standard character of the class to be identified, the raster area difference voltages and the sum raster area difference voltage;

C. forming, from said raster area difference voltages and said sum raster area difference voltage, two types of linear combinations, where 1. the linear combinations of the first type produce output voltages, each of which is formed as a difference of two voltage types respectively, where the first voltage type
   a. consists of only one raster area difference voltage, the value of which, in the case of an image field divided into 9–30 raster areas, amounts to at least 2%, and in the case of an image field divided into 30–60 raster areas at least 1.5%, of the sum raster area difference voltage, or
   b. is formed from several raster area difference voltages, the total value of which, in the case of an image field divided into 9–30 raster areas amounts to at least 7%, and in the case of an image field divided into 30–60 raster areas, at least 4%, of the sum raster area difference voltage, and the second voltage type is formed from the sum raster area difference voltage such that it has the same value as the first voltage type but the opposite polarity and 2. the linear combinations of the second type produce output voltages formed from at least one raster area difference voltage, the total value of which, in the case of an image field divided into 9–30 raster areas, amounts to not more than 5%, and, in the case of an image field divided into 30–60 raster areas, to not more than 3%, of the sum raster area difference voltage, D. ascertaining, for the character to be classified, the raster area difference voltages and the sum raster area difference voltage;

E. forming, from said raster area difference voltages and sum raster area difference voltage associated with the character to be classified, the same linear combinations as those established for the standard character; and F. ascertaining:
1. whether the output voltage of each linear combination of the first type does not deviate more than ± 30% from the value of the second voltage type, and
2. whether the output voltage of each linear combination of the second type is less than the sum of (1) 1% of the sum raster area difference voltage and (2) the percentage of the sum raster area difference voltage represented by the sum of the individual raster area difference voltages used in forming the linear combination of the second type in accordance with step C(2) above.

2. The method according to claim 1, in which, in step C(1)(a), said raster area difference voltage amounts, in the case of an image field divided into 9–30 raster areas, to at least 3%, and in the case of an image field divided into 30–60 raster areas, to at least 2% of the sum raster area difference voltage, and in step C(1)(b), said total value of several raster area difference voltages amounts, in the case of an image field divided into 9–30 raster areas, to at least 10%, and in the case of an image field divided into 30–60 raster areas, to at least 6% of the sum raster area difference voltage, and in step C(2), said output voltages from linear combinations of the second type have a total value, in the case of a image field divided into 9–30 raster areas, not more than 3%, and in the case of an image field divided into 3–60 raster areas, not more than 2%, of the sum raster area difference voltage.

3. The method according to claim 1 in which said first voltage type for each of the linear combinations of the first type is formed from several raster area difference voltages, the total value of which amounts to not more than 60% of the sum raster area difference voltage.

4. The method according to claim 3 in which, for each character class, the number of linear combinations is 60–100% of the number of raster areas.

5. The method in accordance with claim 1 in which the second voltage type used in forming a linear combination of the first type is formed from at least 1 raster area difference voltage, having a total value equal to that of the first voltage type but the opposite polarity.

* * * * *